(12) United States Patent
Miyake et al.

(10) Patent No.: US 9,349,343 B2
(45) Date of Patent: May 24, 2016

(54) VEHICULAR APPARATUS AND EXTERNAL DEVICE SCREEN IMAGE DISPLAY SYSTEM

(75) Inventors: Kenji Miyake, Anjo (JP); Hideo Miyauchi, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 105 days.

(21) Appl. No.: 14/006,561

(22) PCT Filed: Feb. 1, 2012

(86) PCT No.: PCT/JP2012/000658
§ 371 (c)(1),
(2), (4) Date: Sep. 20, 2013

(87) PCT Pub. No.: WO2012/127768
PCT Pub. Date: Sep. 27, 2012

(65) Prior Publication Data
US 2014/0015849 A1   Jan. 16, 2014

(30) Foreign Application Priority Data
Mar. 23, 2011   (JP) ................. 2011-064732

(51) Int. Cl.
*G09G 5/00* (2006.01)
*G09G 5/14* (2006.01)
*G06F 3/147* (2006.01)

(52) U.S. Cl.
CPC ............. *G09G 5/003* (2013.01); *G06F 3/147* (2013.01); *G09G 5/14* (2013.01); *G09G 2340/14* (2013.01); *G09G 2354/00* (2013.01); *G09G 2380/10* (2013.01)

(58) Field of Classification Search
CPC ...................................... G09G 5/14
See application file for complete search history.

(56) References Cited

U.S. PATENT DOCUMENTS

2003/0156097 A1   8/2003   Kakihara et al.
2007/0182728 A1*  8/2007   Fujimori ............. 345/204

(Continued)

FOREIGN PATENT DOCUMENTS

JP   2003244343 A   8/2003
JP   2005236969 A   9/2005

(Continued)

OTHER PUBLICATIONS

International Search Report and Written Opinion for PCT/JP2012/000658 (in Japanese with English Translation), mailed Apr. 24, 2012; ISA/JP.

(Continued)

*Primary Examiner* — Joni Richer
*Assistant Examiner* — Grace Q Li
(74) *Attorney, Agent, or Firm* — Harness, Dickey & Pierce, P.L.C.

(57) ABSTRACT

A vehicular apparatus connected to an external device having a display unit and obtaining picture cell information of each picture cell of the display unit includes: a vehicular display unit for displaying a screen image, which is displayed on the display unit, according to the picture cell information; a control content memory device for storing a control content in connection with picture cell related screen image information, which is determined by the picture cell information; a picture cell related screen image information determination device for determining the picture cell related screen image information based on the picture cell information; and a control device for determining the control content based on the picture cell related screen image information determined by the picture cell related screen image information determination device and a stored content in the control content memory device, and for executing a determined control.

6 Claims, 3 Drawing Sheets

(56) References Cited

U.S. PATENT DOCUMENTS

| | | | |
|---|---|---|---|
| 2010/0110314 A1 | 5/2010 | Kusano | |
| 2010/0192178 A1* | 7/2010 | Candelore | 725/39 |
| 2010/0220250 A1* | 9/2010 | Vanderwall et al. | 348/837 |
| 2010/0251283 A1* | 9/2010 | Smith | 725/25 |
| 2011/0043642 A1* | 2/2011 | Yu et al. | 348/207.1 |
| 2011/0184982 A1* | 7/2011 | Adamousky et al. | 707/776 |

FOREIGN PATENT DOCUMENTS

| | | |
|---|---|---|
| JP | 2009281991 A | 12/2009 |
| JP | 2010036871 A | 2/2010 |
| JP | 2010107380 A | 5/2010 |
| JP | 2010-130553 | 6/2010 |
| JP | 2010130670 A | 6/2010 |
| JP | 2010185779 A | 8/2010 |
| JP | 2010276373 A | 12/2010 |

OTHER PUBLICATIONS

Office Action dated Jun. 3, 2015 issued in the corresponding Chinese Application No. 201280014662.3 with English translation.

\* cited by examiner

VEHICULAR APPARATUS AND EXTERNAL DEVICE SCREEN IMAGE DISPLAY SYSTEM

CROSS-REFERENCE TO RELATED APPLICATIONS

This application is a U.S. National Stage of International Application No. PCT/JP2012/000658, filed on Feb. 1, 2012 and published in Japanese as WO 2012/127768 on Sep. 27, 2012. This application is based on Japanese Patent Application No. 2011-064732 filed on Mar 23 , 2011. The disclosures of the above applications are incorporated herein by reference.

TECHNICAL FIELD

The present disclosure relates to a vehicular apparatus for displaying a display screen image of an external device, and an external device screen image display system having the vehicular apparatus and the external device.

BACKGROUND ART

An apparatus for displaying a display screen image of an external device is well known as a vehicular apparatus. For example, patent literature No. 1 teaches the apparatus. The apparatus in patent literature No. 1 displays a screen image of a cell phone as the external device on a display unit of a vehicle. Further, in patent literature No. 1, the vehicular apparatus distinguishes the content of the information in the screen image of the cell phone. Specifically, the apparatus identifies traffic information, motion picture information or music information. Thus, the apparatus changes the dimensions of the screen image of the cell phone to be displayed on the display unit of the vehicle, or does not display the screen image, according to the information of the screen image and a driving status of the vehicle. In order to perform the identification with the vehicular apparatus, information for the identification is added to the image data on a cell phone side.

Further, technique is proposed such that, even if an application program of a mobile terminal is not installed in the vehicular apparatus, the display unit of the vehicular apparatus can display the screen image of the mobile terminal, and further, the mobile terminal is operable with the operation from the vehicular apparatus (e.g., a touch operation of the screen). For example, a terminal mode is well known as a standard for the technique. Here, although the terminal mode is an example of the above described technique, the terminal mode represents a generic term of the above described technique in the present description.

In the terminal mode, the vehicular apparatus is used for a screen image display unit and an operation unit of the mobile terminal. Thus, it is not necessary, in general, to install the application program of the mobile terminal in the vehicular apparatus. Further, the information transmitted from the mobile terminal to the vehicular apparatus is, in general, only color information of each picture cell (i.e., picture cell information). In the terminal mode, even if the application program of the mobile terminal (that is simply defined as an application program) is not installed in the vehicular apparatus, the vehicular apparatus can utilize the function of the mobile terminal. Thus, advantages are obtained such that the process load of the vehicular apparatus is reduced.

As described above, in the terminal mode, the information transmitted from the mobile terminal to the vehicular apparatus is only the picture cell information, in general. Further, as described above, the application program of the mobile terminal is not installed in the vehicular apparatus. Accordingly, it is difficult for the vehicular apparatus to add a function to the application program under a condition that the application program of the mobile terminal is executed, and the screen image of the application program is displayed on the vehicular apparatus.

For example, in patent literature No. 1, the information for identification to identify a type of the image data is attached to the image data, and then, the information is transmitted to the vehicular apparatus. However, in the terminal mode, the information for identification is not transmitted, in general. Thus, as described in patent literature No. 1, it is impossible to change the dimensions of the screen image of the cell phone to be displayed on the display unit of the vehicle according to the information for identification.

Further, recently, multiple mobile terminals having a navigation function (i.e., a road guidance function) are well known. It is considered that the navigation screen image of the mobile terminal may be displayed on the display unit of the vehicle in the terminal mode. In this case, similar to a vehicular navigation apparatus, while driving, the display unit displays a road map, and it is preferable to restrict a part of functions (such as a touch switch operation). When the touch switch operation is restricted, the vehicular navigation apparatus maintains the display color of the road map, and changes the color of the touch switch (e.g., reduces a color tone) to be a color indicative of non-operable status. However, in the terminal mode, as described above, in general, only the picture cell information is transmitted from the mobile terminal to the vehicular apparatus, so that data indicative of the touch switch is not transmitted. Accordingly, in the terminal mode, it is impossible for the vehicular apparatus to change and display a part of the screen image of the mobile terminal according to the conventional art.

Further, it is considered that it is requested to add various functions, with using the vehicular apparatus side, to the application program executed by the mobile terminal under a condition that the screen image of the mobile terminal is displayed on the vehicular apparatus in the terminal mode. However, in the terminal mode, difficulty arises such that it is impossible to add various functions such as a driving restriction function, with using the vehicular apparatus side, to the application program executed by the mobile terminal according to the conventional art.

PRIOR ART LITERATURES

Patent Literature

Patent literature No. 1: JP-A-2009-281991

SUMMARY OF THE INVENTION

In view of the above difficulties, it is an object of the present disclosure to provide a vehicular apparatus for adding a function to an application program executed by an external device with using a vehicular side even if only picture cell information is obtained from the external device, and to provide an external device screen image display system having the vehicular apparatus and the external device.

According to a first aspect of the present disclosure, a vehicular apparatus, which is connected to an external device having a display unit and obtains picture cell information of each picture cell of the display unit of the external device, includes: a vehicular display unit for displaying a screen image, which is displayed on the display unit of the external device, according to the picture cell information; a control content memory device for storing a control content in connection with picture cell related screen image information, which is determined by the picture cell information; a picture cell related screen image information determination device for determining the picture cell related screen image information based on the picture cell information; and a control device for determining the control content based on the picture cell related screen image information determined by the picture cell related screen image information determination device and a stored content in the control content memory device, and for executing a determined control.

The above described vehicular apparatus can determine the control content based on the picture cell information. Thus, even if only the picture cell information is obtained from the external device, a function can be added to an application program which is executed by the external device, on a vehicular side.

According to a second aspect of the present disclosure, an external device screen image display system for displaying a screen image of a display unit of an external device on a vehicular display unit of a vehicular apparatus, includes: the vehicular apparatus according to the first aspect; and the external device. The picture cell related figure information includes a figure color characteristic to be displayed on the vehicular display unit. The control content memory device stores the control content in connection with the figure color characteristic. The external device controls the display unit to display a predetermined figure, which provides the control content stored in the control content memory device, so as to have the figure color characteristic. The external device transmits successively the picture cell information of each picture cell of the display unit to the vehicular apparatus. The picture cell related screen image information determination device determines the figure color characteristic based on the change of color in the screen image determined by the picture cell information.

In the above case, the external device displays the predetermined figure to have the figure color characteristic stored in the control content memory device of the vehicular apparatus. Thus, the vehicular apparatus improves a determination accuracy of the figure color characteristic, and improves an execution accuracy of the control content in connection with the figure color characteristic. Further, it is not necessary to change a conventional application program other than a feature such that the predetermined figure is displayed to have the figure color characteristic stored in the control content memory device of the vehicular apparatus. Thus, the change of the application program is reduced.

BRIEF DESCRIPTION OF THE DRAWINGS

The above and other objects, features and advantages of the present disclosure will become more apparent from the following detailed description made with reference to the accompanying drawings. In the drawings.

EMBODIMENTS FOR CARRYING OUT THE INVENTION

Figure 1:
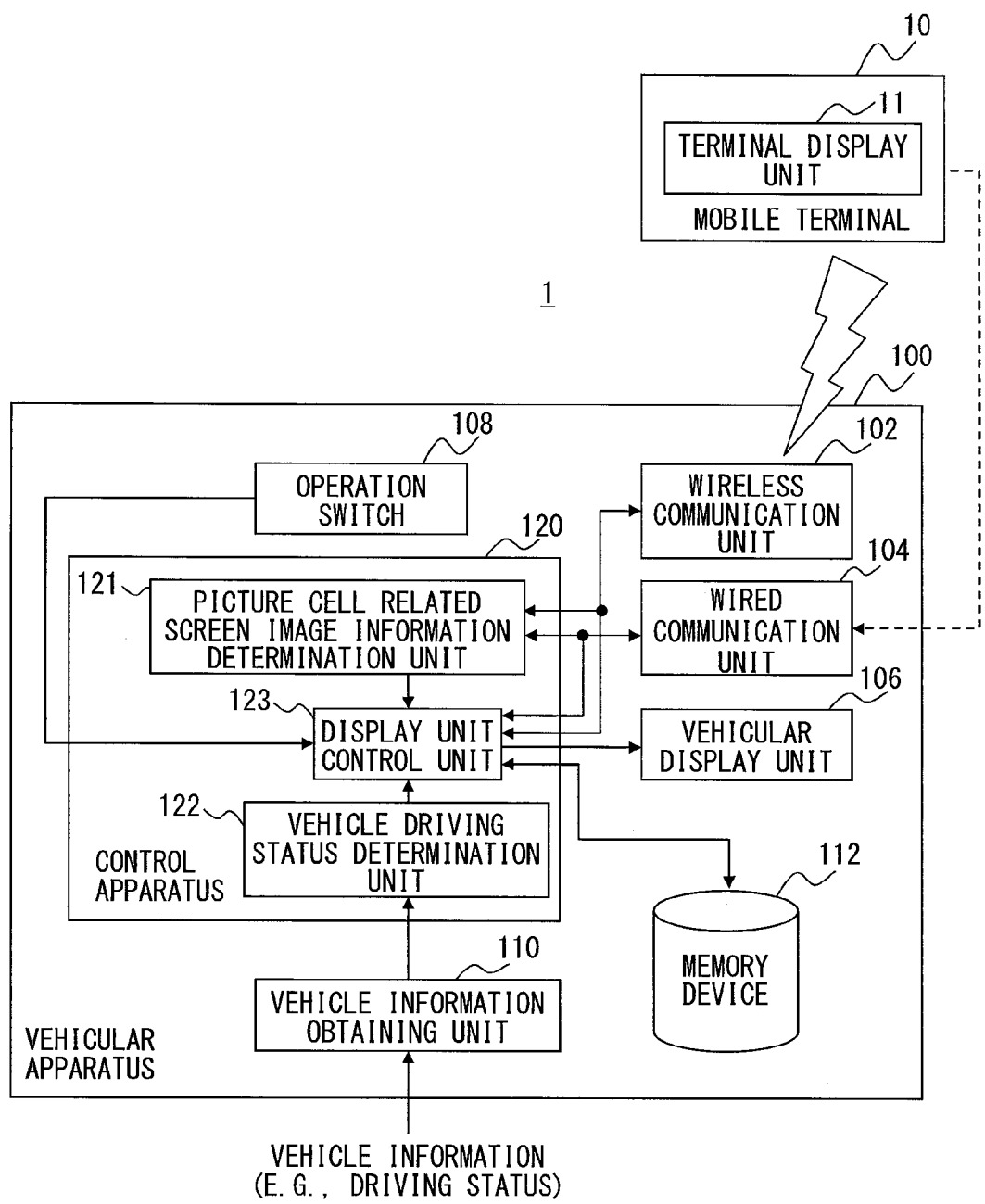
FIG. 1 is a diagram of a system construction of an external device screen image display system 1 according to the present disclosure.

Embodiments of the present disclosure will be explained as follows with reference to the drawings. FIG. 1 is a diagram of a system construction of an external device screen image display system 1 according to the present disclosure. As shown in FIG. 1, the external device screen image display system 1 includes a mobile terminal 10 and a vehicular apparatus 100.

The mobile terminal 10 corresponds to an external device. The mobile terminal 10 is a conventional smart phone, other cell phones, a PDA or the like. The mobile terminal 10 includes a terminal display unit 11. Further, the terminal 10 includes a CPU, a ROM, a RAM and the like, which are not shown in the drawings, therein. The ROM stores various application programs. When the CPU executes the application program stored in the ROM, the screen image having various contents is displayed on the terminal display unit 11.

Various screen images are displayed on the terminal display unit 11 since a type of the mobile terminal 10 is different, and/or the application program executed is different. Here, in the present embodiment, a button image stored as a driving restriction object button image in a memory device 112 of the vehicular apparatus 100 is displayed so as to have a color characteristic in association with driving restriction control.

The mobile terminal 10 is capable of communicating with the vehicular apparatus 100 in at least one of wired communication manner and wireless communication manner. The wired communication manner is performed by, for example, a communication method with a USB cable. The wireless communication manner is performed by, for example, a communication method with Bluetooth (that is registered trade mark) standards. The mobile terminal 10 successively transmits the picture cell information of each picture cell, (i.e., information indicative of color of each picture cell) in the screen image displayed on the terminal display unit 11, to the vehicular apparatus 100 under a condition that the communication between the mobile terminal 10 and the vehicular apparatus 100 is established.

The vehicular apparatus 100 includes a wireless communication unit 102, a wired communication unit 104, a vehicular display unit 106, an operation switch 108, a vehicular information obtaining unit 110, a memory device 112, and a control device 120. The wireless communication unit 102 provides the wireless communication manner with the mobile terminal 10. The wired communication unit 104 provides the wired communication manner with the mobile terminal 10. Here, the apparatus 100 may include only one of the wireless communication unit 102 and the wired communication unit 104.

The picture cell information transmitted from the mobile terminal 10 is received via the communication units 102, 104. The picture cell information is inputted into the control device 120. The control device 120 controls the vehicular display unit 106 to display the screen image (i.e., a terminal screen image), which has been displayed on the terminal display unit 11, according to the picture cell information received via the communication units 102, 104. The terminal screen image to be displayed on the vehicular display unit 106 is referred as a pseudo terminal screen image. The pseudo terminal screen image is, in general, equal to the terminal screen image. According to the number of picture cells in the display unit, the difference of dimensions of the display unit, the difference of an aspect ratio of a display region and the like, coordinates of a whole of the terminal screen image is converted according to a common protocol so that the pseudo terminal screen image is generated. Further, as described later, based on picture cell related screen image information, a part of the terminal screen image is appropriately modified so that the pseudo terminal screen image is generated.

The vehicular display unit 106 is arranged at a position, which is visible for a passenger in a compartment of the vehicle. The above pseudo terminal screen image is displayed on the unit 106. For example, a display mounted on the conventional navigation apparatus may be used as the vehicular display unit 106.

The operation switch 108 is a switch, through which the passenger of the vehicle operates the vehicular apparatus 100. The operation switch 108 includes a touch switch overlapped on a display surface of the vehicular display unit 106 and/or a remote control switch for remotely controlling the display surface. Under a condition that the vehicular display unit 106 displays the pseudo terminal screen image, when the touch switch is operated and touched, the information indicative of the touch operation position is transmitted to the mobile terminal 10. Here, as described later, in the present embodiment, the information indicative of the touch operation position may not be transmitted to the mobile terminal 10. When the information indicative of the touch operation position is transmitted, the mobile terminal 10 determines a corresponding position on the terminal display unit 11 according to the information so that the terminal 10 executes the same process as a case where the corresponding position is touched and operated.

The vehicle information obtaining unit 110 obtains the vehicle information of the vehicle, on which the vehicular apparatus 100 is mounted, from other devices and sensors in the vehicle via an in-vehicle LAN or the like. The obtained vehicle information includes driving status information indicative of a driving status of the vehicle (e.g., whether the vehicle is in driving). Specifically, the driving status information includes vehicle speed, a shift lever position, a location of the vehicle and the like.

The memory device 112 functions as a control content memory means. The device 112 stores the control content in connection with the picture cell related screen image information. The picture cell related screen image information is information determined by the picture cell information, which is transmitted from the mobile terminal 10 and indicative of some sort of information relating to the terminal screen image. The picture cell related screen image information includes picture cell related figure information and motion picture existence information. The picture cell related figure information is information indicative of display characteristics of a figure in the terminal screen image. The motion picture existence information is information indicative of existence of a motion picture in the terminal screen image. Further, the picture cell related figure information includes figure color characteristics and restriction figure region.

The figure color characteristics indicate the characteristics of color of the figure in the terminal screen image. Specifically, the characteristics indicate outline color of the figure and inner color of the figure. The restriction figure region indicates the display region of the driving restriction object figure displayed on the vehicle display unit 106. Further, the restriction figure region includes a restriction button region such that the figure provides the button. In addition, the picture cell related figure information includes a character and a symbol other than the character as a figure. Further, the picture cell related figure information indicates the position and the size of the figure in the terminal screen image in addition to the figure color characteristics and the restriction figure region.

The memory device 112 stores the control content in connection with above described various picture cell related screen image information. Next, the control content will be explained. For example, the control content stored in connection with the restriction figure region includes the following control contents of (1) and (2). Further, the control content includes the control content of (3) as the control content stored in connection with the motion picture existence information.

The control content (1) indicates the control content for restricting and displaying the restriction figure region of the pseudo terminal screen image to reduce the visibility thereof lower than the display region of the driving restriction object figure displayed on the terminal screen. The degree of reduction of the visibility may be determined appropriately. The restriction display may provide a case for display nothing.

The control content (2) indicates the control content stored in connection with the restriction button region. The control content is the control content for transmitting the information indicative of the touch operation position to the mobile terminal 10 when the restriction button region of the pseudo terminal screen image is touched and operated in a case where the vehicle is not running, and for not transmitting the information indicative of the touch operation position to the mobile terminal 10 even when the restriction button region of the pseudo terminal screen image is touched and operated through a touch switch overlapped on the display surface of the vehicular display unit 106 in a case where the vehicle is running.

The control content (3) is the control content stored in connection with the motion picture existence information. The control content is the control content for not displaying the motion picture on the pseudo terminal screen when the motion picture existence information is information indicative of the existence of the motion picture on the terminal screen image in a case where the vehicle is running. When the motion picture is not displayed, a predetermined stationary picture is displayed in the motion picture display region.

The control device 120 is a computer having a CPU, a ROM, a RAM and the like therein, which are not shown in the drawing. The CPU executes a process with utilizing the functions of the ROM, the RAM and the like, so that the control device 120 functions as the picture cell related screen image information determination unit 121, the vehicle driving status determination unit 122 and the display unit control unit 123.

The picture cell related screen image information determination unit 121 corresponds to picture cell related information determination means. The unit 121 determines various picture cell related screen image information, which is stored in the memory unit 112 in connection with the control content, with using the terminal screen image based on the picture cell information obtained via the communication units 102, 104.

As describe above, the picture cell related screen image information includes the screen image related figure information. The screen image related figure information includes the figure color characteristics indicative of the characteristics of color of the figure in the terminal screen image. When the figure color characteristics are determined, it is necessary to determine the region, in which the figure is displayed in the screen. This determination is performed with conventional various utilizing image recognition techniques. For example, connecting parts having the same color in the screen image are recognized as one figure. Further, when the recognized figure provides a line and a closed shape, the figure is recognized as a frame of the figure, so that the frame and the inside of the frame are recognized as one figure. The figure color characteristics indicate the colors of the frame of the figure and the inside of the frame, which are recognized by the above ways. Here, multiple colors may be used in many figures. In this case, one color having an occupation ratio in the figure equal to or larger than predetermined value is defined as the figure color characteristics.

Further, the screen image related figure information includes figure shape characteristics indicative of the characteristics of the shape of the figure in the terminal screen image. When the figure shape characteristics are determined, well-known various image recognition techniques are utilized as described above. When the determination of the figure shape characteristics may be performed according to the character information read out from the terminal screen image by a character recognition process and the character information preliminary stored. Specifically, when the character information read out from the screen image information displayed on the terminal screen coincides with the character information preliminary stored, the character information on the terminal screen image, a certain region around the region, in which the character information is displayed, or a region inside of the frame line in a case where the frame line is disposed around the character information is determined as the figure shape characteristics.

Further, as described above, the screen image related figure information includes the restriction figure region. When the restriction figure region is determined, for example, the driving restriction object figure is preliminary stored, and the restriction figure region is determined in the terminal screen image by matching a pattern of the preliminary stored driving restriction object figure. Here, an example of the driving restriction object figure is a character, a symbol other than the character, or a driving restriction object button, as described above. Here, the determination of the restriction figure region may be performed according to the character information read out from the terminal screen image by the character recognition process and the preliminary stored restriction character information. Specifically, when the character information read out from the screen image information displayed on the terminal screen coincides with the preliminary stored restriction character information, a predetermined region around the region, in which the character information is displayed on the terminal screen, or a region inside of the frame line when the frame line is arranged around the region is determined as the restriction figure region. Further, another determination method for the restriction figure region is such that the figure color characteristics of the driving restriction object figure is stored, and the figure color characteristics are detected from the terminal screen image, so that the restriction figure region is determined. Specifically, the outline color or the inner color of the driving restriction object figure is stored, and a region, in which the outline color or the inner color of the driving restriction object figure is used, is detected from the terminal screen image, so that the restriction figure region is determined.

Further, the picture cell related screen image information includes the motion picture existence information indicating whether the motion picture exists in the terminal screen image. The motion picture existence information is determined as follows. Specifically, it is determined whether the motion picture exists in the terminal screen image, according to determination whether the picture cell information regarding the same picture cell is changed for a short time.

The vehicle driving status determination unit 122 determines successively whether the vehicle is driving or not driving, based on the driving status information obtained by the vehicular information obtaining unit 110. The picture cell information is successively supplied to the display unit control unit 123 from the communication units 102, 104. The picture cell related screen image information is successively supplied to the display control unit 123 from the picture cell related screen image information determination unit 121. The determination result indicative of the determination whether the vehicle is driving or not driving is successively supplied to the display control unit 123 from the vehicle driving status determination unit 122. The display unit control unit 123 corresponds to the control means.

The display control unit 123 controls the vehicular display unit 106 to display the pseudo terminal screen image according to the picture cell information supplied successively from the communication units 102, 104. The pseudo terminal screen image is a screen image modified in a whole of the terminal screen image according to a common protocol. Here, when the terminal screen image includes the picture cell related screen image information stored in connection with the control content stored in the memory device 112, the pseudo terminal screen image modified according to the control content is displayed on the vehicular display unit 106.

Further, the display control unit 123 executes not only the display content control of the vehicular display unit 106 but also the control in a case where the vehicular display unit 106 is touched and operated via the operation switch 108. Specifically, when the signal showing that the pseudo terminal screen is touched and operation is supplied from the operation switch 108, the information indicative of the touch operation position is transmitted to the mobile terminal 10. Here, since the memory device 112 stores the above described control content of (2), in a case where the vehicle is driving, the information indicative of the touch operation position is not transmitted to the mobile terminal 10 even if the restriction button region of the pseudo terminal screen is touched and operation via the touch switch overlapped on the display surface of the vehicular display unit 106.

Next, the control content executed by the control device 120 will be explained with reference to a flowchart shown in FIG. 2. The flowchart is executed under a condition that the communication between the vehicular apparatus 100 and the mobile terminal 10 is established, and the picture cell information is transmitted from the mobile terminal 10.

First, in step S1, the image data (i.e., the picture cell information) is obtained from the reception units 102, 104. This process is executed by the picture cell related screen image information determination unit 121. Then, steps S2 and S3 are process in the vehicle driving status determination unit 122. Specifically, in step S2, the driving status of the vehicle is obtained from the vehicular information obtaining unit 110. In step S3, based on the driving status obtained in step S2, it is determined whether the vehicle is driving. When the determination is negative, it goes to step S4. When the determination is positive, it goes to step S7.

Steps S4 to S6 are a process in the display control unit 123. Specifically, in step S4, the screen image displayed on the terminal display unit 11 of the mobile terminal 10 is reproduced and displayed on the vehicular display unit 106 according to the image data obtained in step S1. In step S5, it is determined whether the screen operation is performed via the operation switch 108. When the determination is negative, it returns to step S1. When the determination is positive, it goes to step S6 so that the information indicative of the touch operation position is transmitted to the mobile terminal 10 via the communication units 102, 104. Then, it returns to step S1.

Next, step S7 and following steps, which are executed in a case where the vehicle is driving, will be explained. Steps S7 and S8 are a process in the picture cell related screen image information determination unit 121. Specifically, in step S7, it is determined whether the driving restriction object figure exists in the image data obtained in step S1. When the driving restriction object figure exists in the image data, the display region of the figure, i.e., the restriction figure region, is also determined. Here, the restriction figure region may include the restriction button region. In step S8, it is determined whether the motion picture exists in the image data.

Steps S9 to S11 are a process in the display control unit 123. Specifically, in step S9, based on the determination results in steps S7 and S8, the pseudo terminal screen image modified for the driving is displayed on the vehicular display unit 106. More specifically, when it is determined in step S7 that the driving restriction object figure exists, the restriction figure region as the region, in which the driving restriction object figure is shown, is modified to a restriction display region having the reduced visibility.

Figure 3:
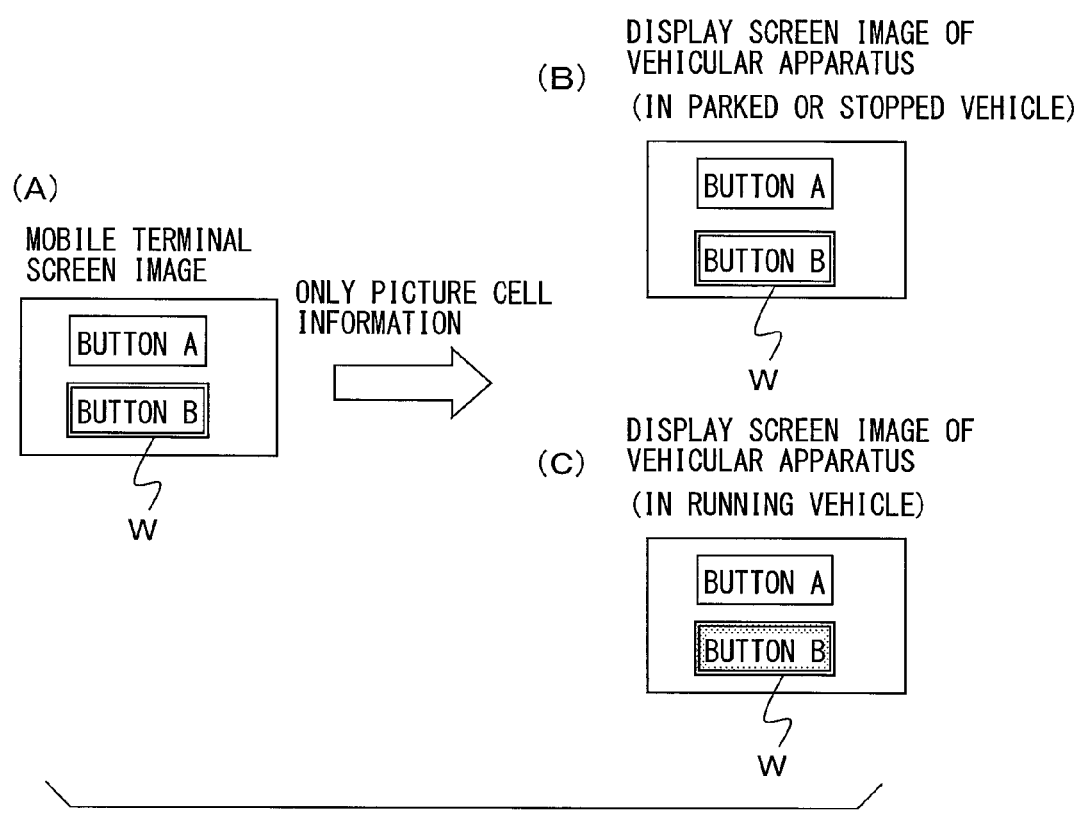
FIG. 3 is a diagram showing an example of restricted display.

Here, an example of the restriction display region will be explained. In (A) of FIG. 3, a part of the screen of the terminal display unit 11 is schematically shown. In (A) of FIG. 3, the button A and the button B are shown. The button B is defined as the driving restriction object button stored in the mobile terminal 10. Since the button B is the driving restriction object button, the button B includes an outline frame W having predetermined driving restriction color as color characteristics in connection with the driving restriction control.

Only the picture cell information is transmitted from the mobile terminal 10 to the vehicular apparatus 100. Since the button B includes the outline frame W having the driving restriction color, the vehicular apparatus 100 can surely determine the restriction button region in a simple process. The vehicular apparatus 100 displays the pseudo terminal screen image as a reproduced terminal screen image on the vehicular display unit 106, as shown in (B) of FIG. 3, when the vehicle is parked or stopped (i.e., when the vehicle is not driving). On the other hand, when the vehicle is driving, as shown in (C) of FIG. 3, the vehicular apparatus 100 displays the pseudo terminal screen image, in which the button B has the visibility lower than the button B on the terminal display unit 11.

Figure 2:
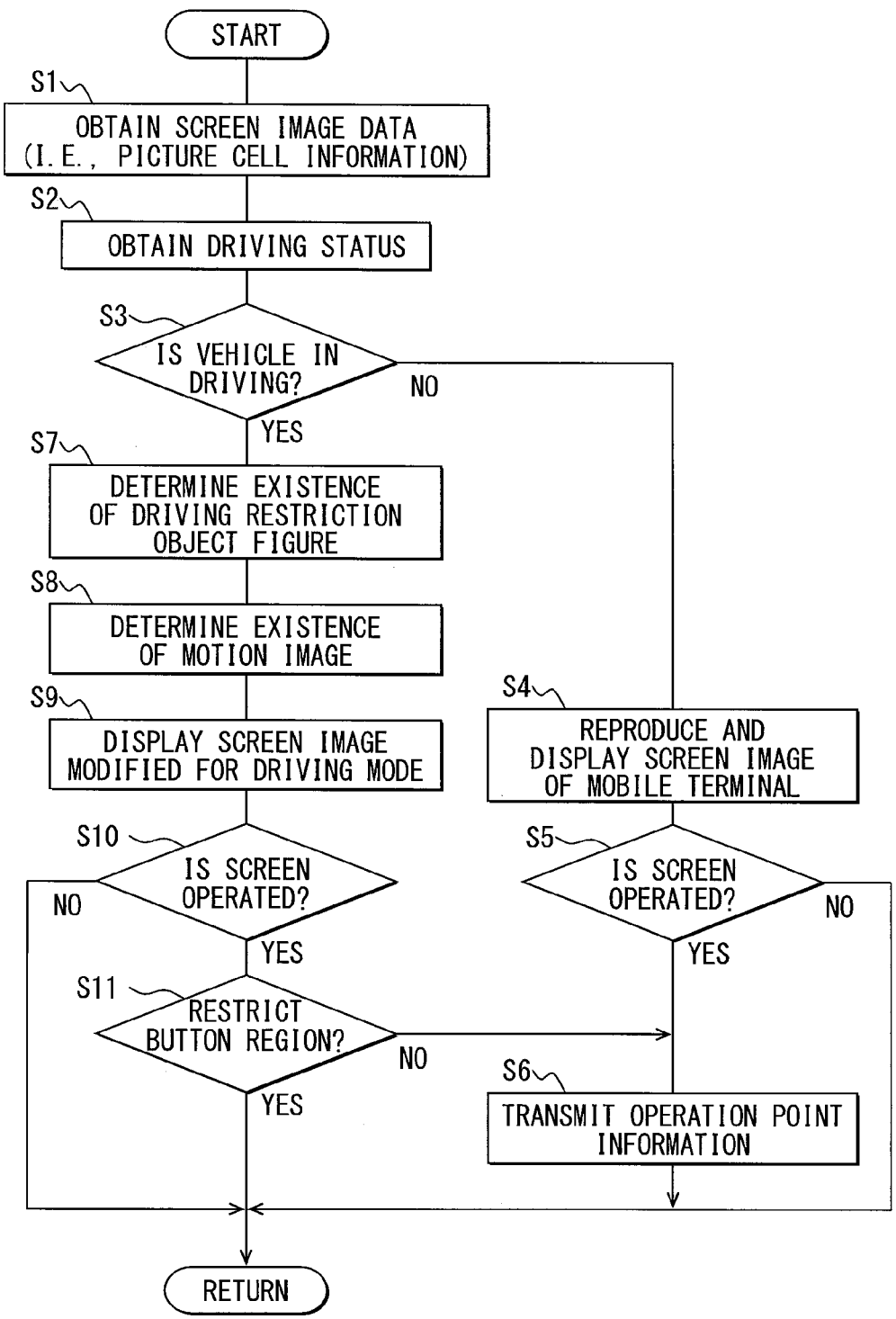
FIG. 2 is a flowchart showing a content of control executed by a control device.

The explanation will be back to FIG. 2. At step S10, it is determined whether the screen operation is performed through the operation switch 108. When the determination is negative, it returns to step S1. On the other hand, when the determination is positive, it proceeds to step S11. In step S11, it is determined whether the touch operation position is disposed in the restriction button region. When the determination is negative, it proceeds to step S6, and, in step S6, the information indicative of the touch operation position is transmitted to the mobile terminal 10 via the communication units 102, 104. On the other hand, when the determination in step S11 is positive, it returns to step S1 directly. Thus, when the touch operation position is disposed in the restriction button region, the information indicative of the touch operation position is not transmitted to the mobile terminal 10.

Thus, according to the present embodiment described above the vehicular apparatus 100 stores the control contents, in connection with the picture cell related screen image information as the screen image information defined by the picture cell information such as the figure color characteristics information and the motion picture existence information, in the memory device 112. Further, the picture cell related screen image information determination unit 121 determines the picture cell related screen image information based on the picture cell information obtained from the mobile terminal 10. The display unit control unit 123 determines and executes the control contents based on the picture cell related screen image information determined by the picture cell related screen image information determination unit 121 and on the memorized content stored in the memory device 112. Thus, since the control contents are determined based on the picture cell information, the vehicular apparatus 100 can add the function such as the previously described functions (1) to (3) into the application program executed by the mobile terminal 10 although only the picture cell information is obtained from the mobile terminal 10.

In the above described embodiment, the color characteristics of the driving restriction object button is the outline frame W of the driving restriction object color. Alternatively, the color characteristics of the driving restriction object button may be a color of an inside of the figure.

Further, in the above described embodiment, the mobile terminal 10 displays the button stored as the driving restriction object button in the memory device 112 of the vehicular apparatus 100 so as to have the color characteristics in connection with the driving restriction control. Alternatively, the mobile terminal 10 may display the figure without considering whether the figure corresponds to the driving restriction control performed by the vehicular apparatus 100. In this case, the vehicular apparatus 100 determines whether the driving restriction control is performed according to the content of the figure decided by various characteristics of the figure on the terminal screen image. The above various characteristics of the figure include information whether the figure is a character or a symbol other than a character, and further, information what kind of the character or the symbol the figure is.

Further, in the above described embodiment, the control contents stored in connection with the restriction figure region are the contents (1) and (2). Alternatively, only one of the contents (1) and (2) may be stored in connection with the restriction figure region. Alternatively, other control contents may be stored in connection with the restriction figure region. The other control content may provide a control for restricting and displaying a specific character or a specific symbol.

The above disclosure has the following aspects.

According to a first aspect of the present disclosure, a vehicular apparatus, which is connected to an external device having a display unit and obtains picture cell information of each picture cell of the display unit of the external device, includes: a vehicular display unit for displaying a screen image, which is displayed on the display unit of the external device, according to the picture cell information; a control content memory device for storing a control content in connection with picture cell related screen image information, which is determined by the picture cell information; a picture cell related screen image information determination device for determining the picture cell related screen image information based on the picture cell information; and a control device for determining the control content based on the picture cell related screen image information determined by the picture cell related screen image information determination device and a stored content in the control content memory device, and for executing a determined control.

The above described vehicular apparatus can determine the control content based on the picture cell information. Thus, even if only the picture cell information is obtained from the external device, a function can be added to an application program, which is executed by the external device, on a vehicular side. Here, the picture cell related screen image information includes picture cell related figure information and motion picture existence information. Further, the picture cell related figure information includes a figure color characteristic, a restriction figure region, and a restriction button region. Furthermore, the figure color characteristic includes an outline color of a figure.

Alternatively, the picture cell related screen image information may include picture cell related figure information, which is information of a figure to be displayed on the vehicular display unit. The picture cell related screen image information determination device determines the picture cell related figure information based on a change of color in the screen image determined by the picture cell information. The control content memory device stores the control content in connection with the picture cell related figure information. Thus, even if only the picture cell information is obtained from the external device, a function can be added to an application program, which is executed by the external device, on a vehicular side according to the figure to be displayed on the vehicular display unit.

Alternatively, the picture cell related figure information may include a figure color characteristic, which is a characteristic of color of the figure to be displayed on the vehicular display unit. The control content memory device stores the control content in connection with the figure color characteristic. The picture cell related screen image information determination device determines the figure color characteristic based on the change of color in the screen image determined by the picture cell information.

Alternatively, the vehicular apparatus may further include: a vehicle driving status determination device for determining whether a vehicle is driving. The picture cell related figure information includes information about a restriction figure region indicative of a driving restriction object figure displayed on the display unit of the external device. The picture cell related screen image information determination device determines the restriction figure region based on the change of color in the screen image determined by the picture cell information. The control content memory device stores the control content in connection with the restriction figure region. The control content includes a control for restricting and displaying the restriction figure region when the vehicle driving status determination device determines that the vehicle is driving. Under the control for restricting and displaying the restriction figure region, the vehicular display unit displays the restriction figure region having a visibility lower than a visibility of the driving restriction object figure displayed on the display unit of the external device. In this case, even if only the picture cell information is obtained from the external device, the display region of the driving restriction object figure to be displayed on the vehicular display unit can be restricted and displayed when the vehicle is driving.

Alternatively, the vehicular apparatus may further include: a vehicle driving status determination device for determining whether a vehicle is driving. The picture cell related figure information includes information about a restriction button region indicative of a driving restriction object button to be displayed on the vehicular display unit. The picture cell related screen image information determination device determines the restriction button region based on the change of color in the screen image determined by the picture cell information. The control content memory device stores the control content in connection with the restriction button region. The control content includes a control for transmitting information indicative of a touch operation position to the external device when the restriction button region is touched and operation in a case where the vehicle driving status determination device determines that the vehicle is not driving. The control content includes a control for not transmitting information indicative of the touch operation position to the external device even when the restriction button region is touched and operation in a case where the vehicle driving status determination device determines that the vehicle is driving. In this case, even if only the picture cell information is obtained from the external device, the operation of the driving restriction object button performed by the vehicular display unit is prohibited when the vehicle is driving.

Alternatively, the picture cell related screen image information may include motion picture existence information, which indicates whether a motion picture is disposed in the screen image to be displayed on the vehicular display unit. The picture cell related screen image information determination device determines the motion picture existence information based on a temporal change of the picture cell information with respect to a same picture cell. The control content memory device stores the control content in connection with the motion picture existence information. Thus, even if only the picture cell information is obtained from the external device, a function can be added to an application program, which is executed by the external device, on a vehicular side according to a determination whether the motion picture is displayed on the vehicular display unit.

Alternatively, the vehicular apparatus may further include: a vehicle driving status determination device for determining whether a vehicle is driving. The control content includes a control for not displaying the motion picture on the vehicular display unit when the vehicle driving status determination device determines that the vehicle is driving, and the motion picture existence information indicates that the motion picture is disposed in the screen image to be displayed on the vehicular display unit. In this case, even if only the picture cell information is obtained from the external device, the motion picture is not displayed on the vehicular display unit when the vehicle is driving.

According to a second aspect of the present disclosure, an external device screen image display system for displaying a screen image of a display unit of an external device on a vehicular display unit of a vehicular apparatus, includes: the vehicular apparatus according to the first aspect; and the external device. The picture cell related figure information includes a figure color characteristic to be displayed on the vehicular display unit. The control content memory device stores the control content in connection with the figure color characteristic. The external device controls the display unit to display a predetermined figure, which provides the control content stored in the control content memory device, so as to have the figure color characteristic. The external device transmits successively the picture cell information of each picture cell of the display unit to the vehicular apparatus. The picture cell related screen image information determination device determines the figure color characteristic based on the change of color in the screen image determined by the picture cell information.

In the above case, the external device displays the predetermined figure to have the figure color characteristic stored in the control content memory device of the vehicular apparatus. Thus, the vehicular apparatus improves a determination accuracy of the figure color characteristic, and improves an execution accuracy of the control content in connection with the figure color characteristic. Further, it is not necessary to change a conventional application program other than a feature such that the predetermined figure is displayed to have the figure color characteristic stored in the control content memory device of the vehicular apparatus. Thus, the change of the application program is reduced.

Alternatively, the control content memory device may define an outline color of the figure as the figure color characteristic, and stores the control content in connection with the outline color. The external device controls the display unit to display the predetermined figure, which provides a predetermined control in the vehicular apparatus, on the display unit so as to have the outline color stored in the control content memory device. The external device successively transmits the picture cell information of each picture cell in the display unit to the vehicular apparatus. The picture cell related screen image information determination device determines the outline color based on the change of color in the screen image determined by the picture cell information. In this case, the external device displays the predetermined figure to have the outline color stored in the control content memory device of the vehicular apparatus. This can be performed by changing the outline color of the figure displayed according to the application program or by adding a frame of the outline color. Thus, the change of the application program is much reduced.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular apparatus connected to an external device having a display unit and obtaining picture cell information of each picture cell of the display unit of the external device, comprising:
   a vehicular display unit for displaying a screen image, which is displayed on the display unit of the external device, according to the picture cell information;
   a control content memory device for storing a control content in connection with picture cell related screen image information, which is determined by the picture cell information;
   a picture cell related screen image information determination device for determining the picture cell related screen image information based on the picture cell information, including whether the screen image includes a motion picture;
   a control device for determining the control content and for executing a determined control;
   a vehicle driving status determination device for determining whether a vehicle is driving, wherein:
   the control device determines the control content based on the picture cell related screen image information determined by the picture cell related screen image information determination device, a stored content in the control content memory device, and a determination result of the vehicle driving status determination device;
   the picture cell related screen image information includes picture cell related figure information, which is information of a figure to be displayed on the vehicular display unit;
   the picture cell related screen image information determination device determines the picture cell related figure information based on a change of color in the screen image determined by the picture cell information;
   the control content memory device stores the control content in connection with the picture cell related figure information;
   the picture cell related figure information includes information about a restriction figure region indicative of a driving restriction object figure displayed on the display unit of the external device;
   the picture cell related screen image information determination device determines the restriction figure region based on the change of color in the screen image determined by the picture cell information;
   the control content memory device stores the control content in connection with the restriction figure region;
   the control content includes a control for restricting and displaying the restriction figure region when the vehicle driving status determination device determines that the vehicle is driving; and
   under the control for restricting and displaying the restriction figure region, the vehicular display unit displays the restriction figure region having a visibility lower than a visibility of the driving restriction object figure displayed on the display unit of the external device.

2. The vehicular apparatus according to claim 1, wherein:
   the picture cell related figure information includes a figure color characteristic, which is a characteristic of color of the figure to be displayed on the vehicular display unit;
   the control content memory device stores the control content in connection with the figure color characteristic; and
   the picture cell related screen image information determination device determines the figure color characteristic based on the change of color in the screen image determined by the picture cell information.

3. The vehicular apparatus according to claim 1, wherein:
   the picture cell related screen image information includes motion picture existence information, which indicates whether the motion picture is disposed in the screen image to be displayed on the vehicular display unit;
   the picture cell related screen image information determination device determines the motion picture existence information based on a temporal change of the picture cell information with respect to a same picture cell; and
   the control content memory device stores the control content in connection with the motion picture existence information.

4. The vehicular apparatus according to claim 3, wherein:
   the control content includes a control for not displaying the motion picture on the vehicular display unit when the vehicle driving status determination device determines that the vehicle is driving, and the motion picture existence information indicates that the motion picture is disposed in the screen image to be displayed on the vehicular display unit.

5. A vehicular apparatus connected to an external device having a display unit and obtaining picture cell information of each picture cell of the display unit of the external device, comprising:
   a vehicular display unit for displaying a screen image, which is displayed on the display unit of the external device, according to the picture cell information;
   a control content memory device for storing a control content in connection with picture cell related screen image information, which is determined by the picture cell information;
   a picture cell related screen image information determination device for determining the picture cell related screen image information based on the picture cell information, including whether the screen image includes a motion picture;
   a control device for determining the control content and for executing a determined control;
   a vehicle driving status determination device for determining whether a vehicle is driving, wherein:
   the control device determines the control content based on the picture cell related screen image information determined by the picture cell related screen image information determination device, a stored content in the control content memory device, and a determination result of the vehicle driving status determination device;

wherein:

the picture cell related screen image information includes picture cell related figure information, which is information of a figure to be displayed on the vehicular display unit;

the picture cell related screen image information determination device determines the picture cell related figure information based on a change of color in the screen image determined by the picture cell information;

the control content memory device stores the control content in connection with the picture cell related figure information;

the picture cell related figure information includes information about a restriction button region indicative of a driving restriction object button to be displayed on the vehicular display unit;

the picture cell related screen image information determination device determines the restriction button region based on the change of color in the screen image determined by the picture cell information;

the control content memory device stores the control content in connection with the restriction button region;

the control content includes a control for transmitting information indicative of a touch operation position to the external device when the restriction button region is touched and operation in a case where the vehicle driving status determination device determines that the vehicle is not driving; and the control content includes a control for not transmitting information indicative of the touch operation position to the external device even when the restriction button region is touched and operation in a case where the vehicle driving status determination device determines that the vehicle is driving.

6. An external device screen image display system for displaying a screen image of a display unit of an external device on a vehicular display unit of a vehicular apparatus, comprising:

the vehicular apparatus; and the external device, wherein:

the vehicular apparatus is connected to the external device having a display unit and obtaining picture cell information of each picture cell of the display unit of the external device, the vehicular apparatus comprising:

a vehicular display unit for displaying a screen image, which is displayed on the display unit of the external device, according to the picture cell information;

a control content memory device for storing a control content in connection with picture cell related screen image information, which is determined by the picture cell information;

a picture cell related screen image information determination device for determining the picture cell related screen image information based on the picture cell information, including whether the screen image includes a motion picture;

a control device for determining the control content and for executing a determined control; and a vehicle driving status determination device for determining whether a vehicle is driving;

the control device determines the control content based on the picture cell related screen image information determined by the picture cell related screen image information determination device, a stored content in the control content memory device, and a determination result of the vehicle driving status determination device;

the picture cell related screen image information includes picture cell related figure information, which is information of a figure to be displayed on the vehicular display unit;

the picture cell related screen image information determination device determines the picture cell related figure information based on a change of color in the screen image determined by the picture cell information;

the control content memory device stores the control content in connection with the picture cell related figure information;

the picture cell related figure information includes a figure color characteristic to be displayed on the vehicular display unit;

the control content memory device stores the control content in connection with the figure color characteristic;

the external device controls the display unit to display a predetermined figure, which provides the control content stored in the control content memory device, so as to have the figure color characteristic;

the external device transmits successively the picture cell information of each picture cell of the display unit to the vehicular apparatus; and the picture cell related screen image information determination device determines the figure color characteristic based on the change of color in the screen image determined by the picture cell information;

the control content memory device defines an outline color of the figure as the figure color characteristic, and stores the control content in connection with the outline color:

the external device controls the display unit to display the predetermined figure, which provides a predetermined control in the vehicular apparatus, on the display unit so as to have the outline color stored in the control content memory device;

the external device successively transmits the picture cell information of each picture cell in the display unit to the vehicular apparatus; and the picture cell related screen image information determination device determines the outline color based on the change of color in the screen image determined by the picture cell information.

* * * * *